United States Patent
Kikuchi (10) Patent No.: US 11,915,411 B2
(45) Date of Patent: Feb. 27, 2024

(54) STRUCTURE MANAGEMENT DEVICE, STRUCTURE MANAGEMENT METHOD, AND STRUCTURE MANAGEMENT PROGRAM

(71) Applicant: FUJIFILM Corporation, Tokyo (JP)

(72) Inventor: Hiroaki Kikuchi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 703 days.

(21) Appl. No.: 17/065,202

(22) Filed: Oct. 7, 2020

(65) Prior Publication Data
US 2021/0018447 A1 Jan. 21, 2021

Related U.S. Application Data (63) Continuation of application No. PCT/JP2019/014596, filed on Apr. 2, 2019.

(30) Foreign Application Priority Data

Apr. 11, 2018 (JP) ................................. 2018-076130

(51) Int. Cl.
*G06T 7/00* (2017.01)
*G01N 21/88* (2006.01)
(Continued)

(52) U.S. Cl.
CPC ......... *G06T 7/001* (2013.01); *G01N 21/8851* (2013.01); *G06T 7/0004* (2013.01);
(Continued)

(58) Field of Classification Search
CPC ..................... G06T 17/05; G06T 17/00; G06T 2207/10028; G06T 7/0004;
(Continued)

(56) References Cited

U.S. PATENT DOCUMENTS 9,609,288 B1 * 3/2017 Richman ................ G05D 1/042
9,805,261 B1 * 10/2017 Loveland ............ G05D 1/0038
(Continued)

FOREIGN PATENT DOCUMENTS

CN 104081434 A * 10/2014 ............ G06T 7/564
EP 3273266 A1 * 1/2018
(Continued)

OTHER PUBLICATIONS

An Office Action; "Notice of Reasons for Refusal," mailed by the Japanese Patent Office dated Jun. 22, 2021, which corresponds to Japanese Patent Application No. 2020-513211 and is related to U.S. Appl. No. 17/065,202 with English language translation.
International Search Report issued in PCT/JP2019/014596; dated May 7, 2019.
International Preliminary Report on Patentability and Written Opinion issued in PCT/JP2019/014596; dated Oct. 13, 2020.

*Primary Examiner* — Michael P Stafira
(74) *Attorney, Agent, or Firm* — Studebaker & Brackett PC (57) ABSTRACT

Provided are a structure management device, a structure management method, and a structure management program capable of suppressing deterioration of image quality of a mapped captured image and easily performing comparison with past inspection result.
A structure management device includes an image acquiring unit (401) that acquires an image group, a damage detecting unit (403) that analyzes images in the image group to detect damage of the structure, a three-dimensional design data acquiring unit (407) that acquires three-dimensional design data indicating the structure, a combined information calculating unit (409) that tracks point group data of feature points common in the overlap area between the images in the image group to calculate combined information including a camera position and a camera posture in a case of capturing the image by the camera and a three-dimensional position of the point group data, and a mapping unit (411) that maps the
(Continued)

detected damage on a surface of the structure indicated by the acquired three-dimensional design data based on the combined information calculated by the combined information calculating unit.

13 Claims, 10 Drawing Sheets

(51) Int. Cl.
*G06V 20/10* (2022.01)
*G06V 10/764* (2022.01)
*G06V 10/46* (2022.01)
*G06V 20/17* (2022.01)
*G06V 20/64* (2022.01)

(52) U.S. Cl.
CPC .......... *G06V 10/462* (2022.01); *G06V 10/764* (2022.01); *G06V 20/10* (2022.01); *G06V 20/17* (2022.01); *G06V 20/176* (2022.01); *G01N 2021/888* (2013.01); *G01N 2021/8864* (2013.01); *G06T 2207/30108* (2013.01); *G06V 20/647* (2022.01)

(58) Field of Classification Search
CPC . G06T 2207/10032; G06T 2207/20081; G06T 7/73; G06T 7/70; G06T 2207/30184; G06T 7/0002; G06T 2207/20084; G06T 5/002; G06T 7/11; G06T 2215/16; G06T 2207/10016; G06T 19/003; G06T 2207/30244; G06T 7/13; G06T 7/80; G06T 2207/30108; G06T 2207/10048; G06T 7/001; G06T 7/136; G06T 7/62; G06T 19/006; G06T 2200/08; G06T 2200/24; G06T 2207/30232; G06T 17/20; G06T 2207/10004; G06T 2207/10012; G06T 2207/20221; G06T 7/60; G06T 7/75; G06T 7/90; G06T 19/20; G06T 7/74; G06T 7/85; G06T 7/97; G06T 15/005; G06T 2207/30148; G06T 3/4038; G06T 7/337; G06T 2207/10024; G06T 2207/10044; G06T 2207/30252; G06T 5/50; G06T 7/50; G06T 17/10; G06T 2207/20012; G06T 7/187; G06T 7/33; G06T 11/00; G06T 2207/20024; G06T 2207/20032; G06T 2207/30164; G06T 2207/30168; G06T 2207/30181; G06T 5/006; G06T 5/20; G06T 7/0008; G06T 7/194; G06T 19/00; G06T 2200/04; G06T 2200/32; G06T 2207/10061; G06T 2207/30188; G06T 2219/004; G06T 2219/2004; G06T 5/003; G06T 5/40; G06T 7/0006; G06T 7/246; G06T 7/55; G06T 7/66; G06T 15/20; G06T 15/205; G06T 2207/20016; G06T 2207/20028; G06T 2207/20036; G06T 2207/20061; G06T 2207/20076; G06T 2207/30204; G06T 2219/2016; G06T 3/0068; G06T 3/4053; G06T 5/009; G06T 5/30; G06T 7/571; G06T 7/77; G06T 9/007; G06T 15/04; G06T 15/55; G06T 2200/36; G06T 2207/10036; G06T 2207/10056; G06T 2207/10116; G06T 2207/20021; G06T 2207/20132; G06T 2207/20201; G06T 2207/30144; G06T 2207/30192; G06T 2207/30248; G06T 2210/56; G06T 3/60; G06T 5/005; G06T 7/10; G06T 7/12; G06T 7/174; G06T 7/20; G06T 7/248; G06T 7/269; G06T 7/30; G06T 7/521; G06T 7/593; G06T 7/64; G06T 1/0014; G06T 15/00; G06T 17/005; G06T 2207/10148; G06T 2207/20004; G06T 2207/20056; G06T 2207/20092; G06T 2207/20104; G06T 2207/20164; G06T 2207/30132; G06T 2207/30172; G06T 2207/30236; G06T 2207/30241; G06T 2210/04; G06T 2210/12; G06T 2210/44; G06T 3/0006; G06T 3/0012; G06T 3/0037; G06T 3/005; G06T 3/40; G06T 3/4007; G06T 3/4061; G06T 5/001; G06T 5/007; G06T 7/168; G06T 7/181; G06T 7/207; G06T 7/292; G06T 7/344; G06T 7/40; G06T 7/41; G06T 7/529; G06T 7/536; G06V 20/176; G06V 20/17; G06V 20/13; G06V 20/10; G06V 10/44; G06V 20/52; G06V 20/64; G06V 2201/06; G06V 20/58; G06V 10/267; G06V 2201/07; G06V 10/764; G06V 10/82; G06V 20/188; G06V 10/245; G06V 10/25; G06V 10/462; G06V 10/774; G06V 10/56; G06V 20/41; G06V 2201/10; G06V 10/22; G06V 10/40; G06V 10/761; G06V 20/20; G06V 10/26; G06V 10/507; G06V 10/62; G06V 10/757; G06V 20/46; G06V 10/28; G06V 10/469; G06V 10/75; G06V 10/751; G06V 10/765; G06V 10/16; G06V 10/20; G06V 10/225; G06V 10/443; G06V 10/457; G06V 10/50; G06V 10/752; G06V 10/77; G06V 10/806; G06V 20/194; G06V 20/36; G06V 20/40; G06V 20/48; G06V 20/56; G06V 20/62; G06V 20/647; G06V 2201/12; G06V 10/143; G06V 10/255; G06V 10/30; G06V 10/54; G06V 10/763; G06V 10/80; G06V 10/803; G06V 10/811; G06V 20/00; G06V 20/182; G06V 20/50; G06V 20/54; G06V 20/584; G06V 20/95; G06V 2201/05; G06V 2201/08; G06V 40/10; G06V 40/172; G06V 40/28; G01N 21/8851; G01N 2021/8887; G01N 2021/1793; G01N 2021/3137; G01N 21/255; G01N 21/31; G01N 2201/129; G01N 21/88; G01N 21/3504; G01N 21/954; G01N 2021/3595; G01N 21/031; G01N 33/0036; G01N 33/0075; G01N 25/72; G01N 2021/95676; G01N 2021/8854; G01N 21/95; G01N 21/95607; G01N 2201/0214; G01N 2021/9518; G01N 21/84; G01N 21/9515; G01N 33/18; G01N 1/10; G01N 17/02; G01N 19/08; G01N 2021/177; G01N 2021/1776; G01N 2021/8845; G01N 2021/8861; G01N 2021/9511; G01N 2021/95615; G01N 21/01; G01N 21/17; G01N 21/25; G01N 21/55; G01N 21/956; G01N 2291/0232; G01N 23/00; G01N 23/04; G01N 27/00; G01N 27/90; G01N 27/9006; G01N 29/045; G01N 29/048; G01N 29/069; G01N 29/226; G01N 33/0073; G01N 1/14; G01N 15/06; G01N 2015/0693; G01N 2021/0112; G01N 2021/0162; G01N 2021/888; G01N 2021/8883; G01N 2021/9544; G01N 21/3563; G01N 21/359; G01N 21/4795; G01N 21/8806; G01N 21/952; G01N 22/02; G01N 2201/1296; G01N 2223/419; G01N 2291/0231; G01N 2291/0234; G01N 2291/0258; G01N 2291/0427; G01N 2291/2634; G01N 23/046; G01N 29/036; G01N 29/04; G01N 29/0618; G01N 29/0654; G01N 29/14; G01N 29/225; G01N 29/228; G01N 29/2412; G01N 29/265; G01N 29/28; G01N 29/44; G01N 30/02; G01N 33/0004; G01N 35/00871; B64U 2101/30; B64U 2201/10; B64U 2101/00; B64U 10/13; B64U 2201/20; B64U 30/20; B64U 10/10; B64U 2101/60; B64U 50/19; B64U 2201/00; B64U 2201/202; B64U 80/82; B64U 80/70; B64U 2201/104; B64U 10/25; B64U 10/00; B64U 50/34; B64U 2201/102; B64U 70/00; B64U 70/80; B64U 50/11; B64U 50/13; B64U 70/30; B64U 70/60; B64U 80/00; B64U 2101/15; B64U 2101/20; B64U 2101/26; B64U 30/10; B64U 50/14; B64U 80/86

See application file for complete search history.

(56) References Cited

U.S. PATENT DOCUMENTS

| | | | |
|---|---|---|---|
| 2006/0111797 A1 | | 5/2006 | Saito et al. |
| 2016/0148363 A1* | | 5/2016 | Phan .................... H04N 23/11 |
| | | | 348/142 |

FOREIGN PATENT DOCUMENTS

| | | | | | |
|---|---|---|---|---|---|
| JP | 2005-141702 | A | | 6/2005 | |
| JP | 2005-310044 | A | | 11/2005 | |
| JP | 2012063866 | A | * | 3/2012 | |
| JP | 2014-134470 | A | | 7/2014 | |
| JP | 2014186566 | A | * | 10/2014 | |
| JP | 2015-114954 | A | | 6/2015 | |
| JP | 2016-126769 | A | | 7/2016 | |
| JP | 2016126769 | A | * | 7/2016 | |
| JP | 2017130049 | A | * | 7/2017 | |
| JP | 2017-151026 | A | | 8/2017 | |
| JP | 2017182695 | A | * | 10/2017 | ......... G06K 9/00637 |
| JP | 2017-227595 | A | | 12/2017 | |
| WO | 2016/157349 | A1 | | 10/2016 | |
| WO | WO-2017116860 | A1 | * | 7/2017 | ......... B64C 39/024 |
| WO | 2017/221706 | A1 | | 12/2017 | |
| WO | WO-2017221706 | A1 | * | 12/2017 | ............ G01B 11/30 |
| WO | WO-2020203263 | A1 | * | 10/2020 | ............ G01B 11/30 |

* cited by examiner

STRUCTURE MANAGEMENT DEVICE, STRUCTURE MANAGEMENT METHOD, AND STRUCTURE MANAGEMENT PROGRAM

CROSS-REFERENCE TO RELATED APPLICATIONS

The present application is a Continuation of PCT International Application No. PCT/JP2019/014596 filed on Apr. 2, 2019 claiming priority under 35 U.S.C § 119(a) to Japanese Patent Application No. 2018-076130 filed on Apr. 11, 2018. Each of the above applications is hereby expressly incorporated by reference, in its entirety, into the present application.

BACKGROUND OF THE INVENTION

1. Field of the Invention

The present invention relates to a structure management device, a structure management method, and a structure management program, in particular, to a technique related to structure management using three-dimensional design data.

2. Description of the Related Art

Since structures such as bridges deteriorate over time, it is necessary to perform regular inspections to grasp and manage the deterioration situation. In the related art, a technique for inspecting and managing the structure has been proposed.

JP2017-227595A discloses a technique for designating damage in a stereo image acquired by a stereo camera and mapping the damage to drawing data in order to quickly and easily create a damage diagram used for management and inspection of a structure. The technique of JP2017-227595A discloses that an imaging position and an imaging direction are detected by a global positioning system (GPS), a movement amount of a robot device, rotation angle of pan-tilt mechanism of the stereo camera, and the like.

In recent years, a technique has been proposed in which a camera is equipped in a moving object represented by a drone, a captured image of the structure is acquired, and a three-dimensional model is generated from the acquired captured image.

For example, JP2015-114954A discloses that a captured image of the structure (building) is acquired by the moving object equipped with the camera, three-dimensional point group is generated by using the structure from motion (SfM), and the polygon is generated based on the three-dimensional point group. In the technique disclosed in JP2015-114954A, the captured image is mapped on the generated polygon.

SUMMARY OF THE INVENTION

However, in the method (method disclosed in JP2015-114954A) of attaching the captured image to the three-dimensional model in which the surface of the structure is represented by a plurality of polygons, the captured image is attached to each polygon, so the image quality of the attached captured image may deteriorate. The deterioration in the image quality is a state that the precision of randomly generated polygons on the surface of the three-dimensional model is low, different captured images are attached to the polygons, so the mapped surface of the three-dimensional model may be uneven.

In a case where the management of the structure is performed, the inspections are regularly performed, and a plurality of inspection results are compared.

In the technique disclosed in JP2015-114954A, the polygon is generated from the captured image, and the captured image is mapped on the polygon, so a different polygon is generated each time the captured image is acquired (for each inspection). Therefore, a different polygon is generated each time the captured image is acquired, and the captured image is attached to the polygon. Therefore, since the captured images are mapped on different polygons for each acquisition of the captured image (inspection), the polygon to which the captured image generated in the past is mapped may have a different shape, and is not suitable for comparison.

The present invention has been made in view of the above circumstances, and is to provide a structure management device, a structure management method, and a structure management program capable of suppressing deterioration of image quality of a mapped captured image and easily performing comparison with the past inspection result.

A structure management device according to one aspect of the present invention for achieving the above object comprises an image acquiring unit that acquires an image group in which a structure is imaged with overlap areas by a camera by moving a moving object equipped with the camera, a damage detecting unit that analyzes images in the image group to detect damage of the structure, a three-dimensional design data acquiring unit that acquires three-dimensional design data indicating the structure, a combined information calculating unit that tracks point group data of feature points common in the overlap area between the images in the image group to calculate combined information including a camera position and a camera posture in a case of capturing the image by the camera and a three-dimensional position of the point group data, and a mapping unit that maps the detected damage on a surface of the structure indicated by the acquired three-dimensional design data based on the combined information calculated by the combined information calculating unit.

According to the aspect, the mapping unit maps the detected damage on the surface of the structure indicated by the acquired three-dimensional design data based on the combined information calculated by the combined information calculating unit, so deterioration of image quality of the mapped damage is suppressed and comparison with the past inspection result can be easily performed.

It is preferable that the mapping unit map the images in the image group on the surface of the structure indicated by the acquired three-dimensional design data based on the combined information calculated by the combined information calculating unit, and map the detected damage on the mapped image.

According to the aspect, the mapping unit maps the images in the image group on the surface of the structure indicated by the acquired three-dimensional design data based on the combined information calculated by the combined information calculating unit, and maps the detected damage on the mapped image. Accordingly, deterioration of image quality of the mapped image and damage is suppressed and comparison with the past inspection result can be easily performed.

It is preferable that the structure management device further comprise a damage evaluating unit that evaluates a degree of the damage detected by the damage detecting unit, and a display unit that displays the acquired three-dimensional design data and the mapped damage, in which the display unit further displays damage information including a result of damage evaluation by the damage evaluating unit in association with a position of the mapped damage.

According to the aspect, the damage evaluating unit evaluates the degree of the damage detected by the damage detecting unit, and the display unit further displays the damage information including the result of damage evaluation by the damage evaluating unit in association with the position of the mapped damage. Accordingly, the user can easily visually recognize the damage and the damage information together.

It is preferable that the structure management device further comprise a damage evaluating unit that evaluates a degree of the damage detected by the damage detecting unit, and a recording unit that records the three-dimensional design data, in which the recording unit records damage information including a result of damage evaluation by the damage evaluating unit in association with position information of the mapped damage.

According to the aspect, the damage evaluating unit evaluates the degree of the damage detected by the damage detecting unit, and the recording unit records the damage information including the result of damage evaluation by the damage evaluating unit in association with the position information of the mapped damage. Accordingly, the position information of the mapped damage and the damage information are efficiently recorded.

It is preferable that the damage information include a type of the damage detected by the damage detecting unit, a rank indicating the degree of the damage evaluated by the damage evaluating unit, and a size of the damage.

It is preferable that the combined information calculating unit calculate the camera position and the camera posture in a case of capturing the images in the image group by the camera and the three-dimensional position of the point group data using a structure from motion (hereinafter, referred to as SfM) method or a simultaneous localization and mapping (hereinafter, referred to as SLAM) method.

According to the aspect, the combined information calculating unit calculates the camera position and the camera posture in a case of capturing the images in the image group by the camera and the three-dimensional position of the point group data by the SfM method or the SLAM method, and thus the camera position and the camera posture, and the three-dimensional position of the point group data can be calculated with a high precision.

It is preferable that the structure management device further comprise the moving object equipped with the camera, and a moving object control unit that controls movement of the moving object and imaging of the camera and causes the camera to capture the image group, in which the image acquiring unit acquire the image group captured by the camera equipped in the moving object. It is preferable that the moving object be a flying object.

A structure management method according to another aspect of the present invention comprises a step of acquiring an image group in which a structure is imaged with overlap areas by a camera using an image acquiring unit by moving a moving object equipped with the camera, a step of analyzing images in the image group to detect damage of the structure using a damage detecting unit, a step of acquiring three-dimensional design data indicating the structure using a three-dimensional design data acquiring unit, a step of tracking point group data of feature points common in the overlap area between the images in the image group to calculate combined information including a camera position and a camera posture in a case of capturing the image by the camera and a three-dimensional position of the point group data using a combined information calculating unit, and a step of mapping the detected damage on a surface of the structure indicated by the acquired three-dimensional design data using a mapping unit based on the calculated combined information.

It is preferable that in the step of mapping, the images in the image group be mapped on the surface of the structure indicated by the acquired three-dimensional design data based on the combined information, and the detected damage be mapped on the mapped image.

It is preferable that the structure management method further comprise a step of evaluating a degree of the detected damage using a damage evaluating unit, and a step of displaying the acquired three-dimensional design data and the mapped damage using a display unit, in which in the step of displaying, damage information including a result of damage evaluation by the damage evaluating unit is further displayed in association with a position of the mapped damage.

A structure management program according to still another aspect of the present invention, which causes a computer to execute a function of acquiring an image group in which a structure is imaged with overlap areas by a camera by moving a moving object equipped with the camera, a function of analyzing images in the image group to detect damage of the structure, a function of acquiring three-dimensional design data indicating the structure, a function of tracking point group data of feature points common in the overlap area between the images in the image group to calculate combined information including a camera position and a camera posture in a case of capturing the image by the camera and a three-dimensional position of the point group data, and a function of mapping the detected damage on a surface of the structure indicated by the acquired three-dimensional design data based on the calculated combined information.

According to the present invention, the mapping unit maps the detected damage on the surface of the structure indicated by the acquired three-dimensional design data based on the combined information calculated by the combined information calculating unit, so deterioration of image quality of the mapped damage can be suppressed and comparison with the past inspection result can be easily performed.

DESCRIPTION OF THE PREFERRED EMBODIMENTS

Preferred embodiments of structure management device, a structure management method, and a structure management program according to the present invention will be described below with reference to the accompanying drawings.

Figure 1:
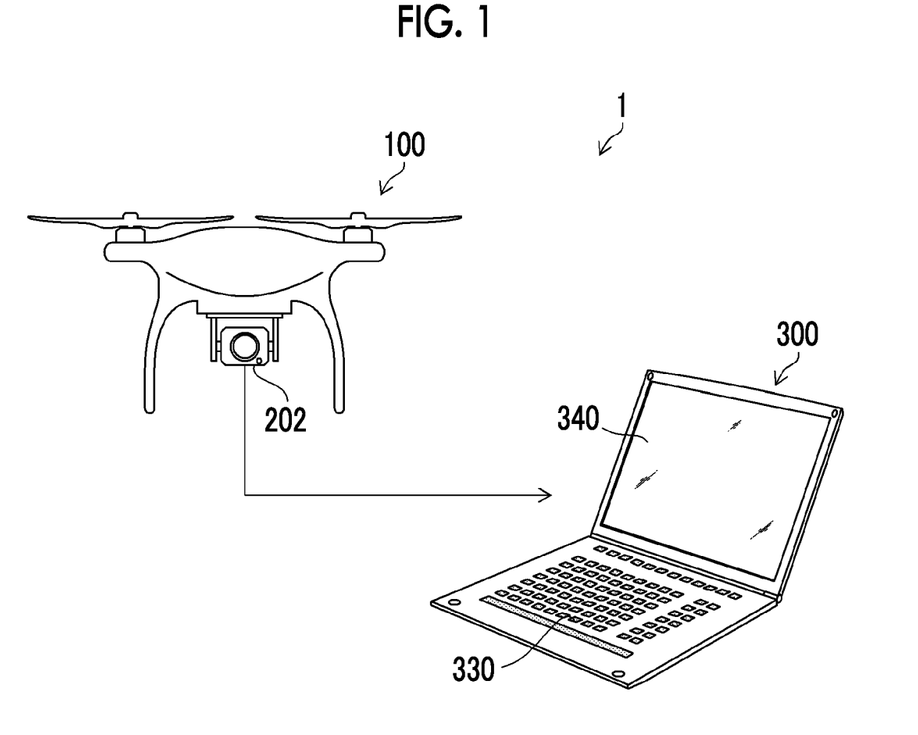
FIG. 1 is a diagram conceptually showing a structure management system.

FIG. 1 is a diagram conceptually showing a structure management system 1 including a structure management device 300 and a moving object 100 according to the embodiment of the present invention. The moving object 100 is an unmanned flying object (drone), for example. Also, the moving object 100 may be an autonomous travel type robot. The moving object 100 acquires, by an equipped camera 202, captured image group including a plurality of captured images of the structure to be managed. Here, the structure is a concrete structure such as a bridge, a dam, a tunnel, or a building.

The structure management device 300 is configured by a computer comprising a central processing unit (CPU), a read-only memory (ROM), random access memory (RAM), and the like, and acquires the captured image group imaged by the camera 202. The computer configuring the structure management device 300 functions as the structure management device 300 by the CPU executing a structure management program stored in the ROM.

Figure 2:
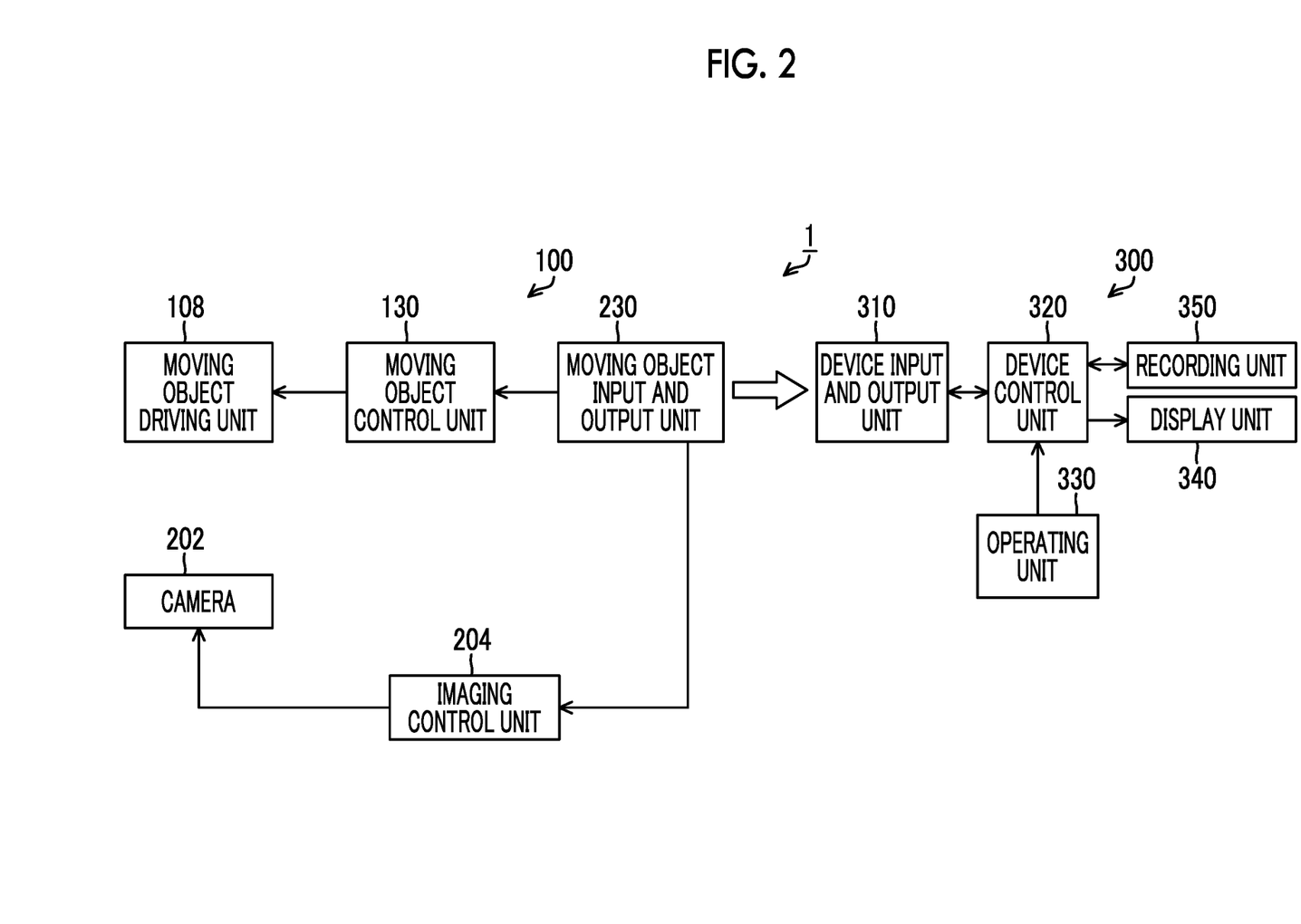
FIG. 2 is a block diagram showing a main functional configuration of the structure management system.

FIG. 2 is a block diagram showing a main functional configuration of the structure management system 1.

The moving object 100 configuring the structure management system 1 mainly comprises a moving object input and output unit 230, a moving object control unit 130, a moving object driving unit 108, the camera 202, and an imaging control unit 204. The structure management device 300 configuring the structure management system 1 includes a device input and output unit 310, a device control unit 320, a recording unit 350, a display unit 340, and an operating unit 330.

The moving object input and output unit 230 is connected by wireless or wire to input and output information. For example, the moving object input and output unit 230 outputs the image group of the structure imaged by the camera 202.

The moving object control unit 130 controls the moving object 100 based on a movement command from a controller (not shown) of the moving object 100, and moves the moving object 100. For example, in a case where the moving object 100 is a drone, which is an unmanned flying object, the driving of propeller is controlled by the moving object control unit 130.

The imaging control unit 204 causes the camera 202 to acquire the captured image based on an imaging command from the controller of the moving object 100. The camera 202 continuously images the structure to be managed with overlap areas, and acquires the image group including a plurality of images. The camera 202 may acquire the image and the image group by capturing a moving image and cutting out a still image from the moving image, or may acquire the still image and acquire the image group. For example, the imaging control unit 204 causes the camera 202 to acquire one captured image every one second and acquires the image group. The overlap area is preferably set to 80% of the captured image for adopting the SfM method.

The structure management device 300 is operated by a user that operates the structure management system 1. The structure management device 300 includes the device input and output unit 310, the device control unit 320, the operating unit 330, the display unit 340, and the recording unit 350.

The device input and output unit 310 is connected by wireless or wire, and performs the input and output of information. For example, the image group acquired by the moving object 100 is input through the device input and output unit 310.

The device control unit 320 acquires the image group via the device input and output unit 310, and maps the damage and the captured image on the three-dimensional design data. Mapping of the damage and captured image to the three-dimensional design data will be described below. The device control unit 320 performs the control of recording on the recording unit 350, the control of display on the display unit 340, and the control in response to the command input by the operating unit 330.

The display unit 340 performs display through the control of the device control unit 320. For example, the display unit 340 displays the three-dimensional design data to which the damage is mapped. The display unit 340 displays damage information including a result of damage evaluation by a damage evaluating unit 405 (FIG. 3) in association with the position of the mapped damage. Here, the damage information includes a type of the damage detected by a damage detecting unit 403 (FIG. 3), a rank indicating the degree of the damage evaluated by the damage evaluating unit 405, and a size of the damage.

The recording unit 350 records various kinds of information through the control of the device control unit 320. For example, the recording unit 350 records the three-dimensional design data to which the damage is mapped. The recording unit 350 records damage information including a result of damage evaluation by the damage evaluating unit in association with the position information of the mapped damage.

Figure 3:
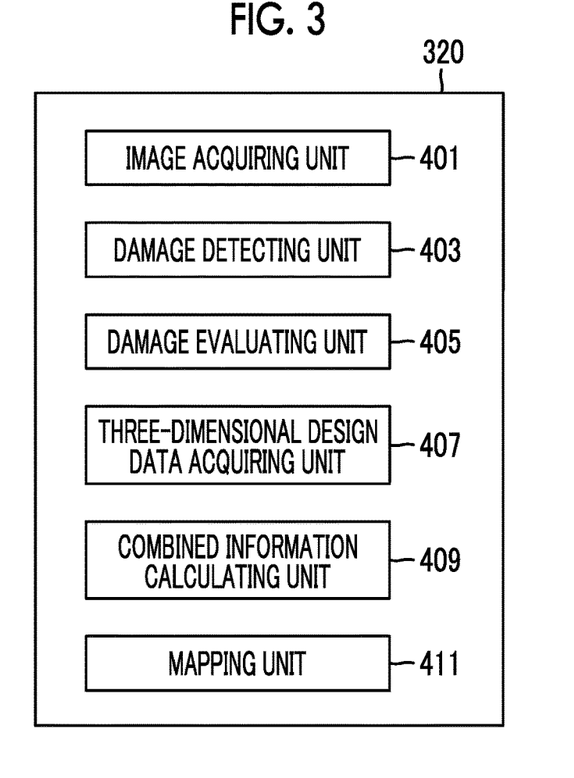
FIG. 3 is a block diagram showing an example of a functional configuration of a device control unit.

FIG. 3 is a block diagram showing an example of a functional configuration of the device control unit 320.

The device control unit 320 includes an image acquiring unit 401, a damage detecting unit 403, a damage evaluating unit 405, a three-dimensional design data acquiring unit 407, a combined information calculating unit 409, and a mapping unit 411.

The image acquiring unit 401 acquires, through the device input and output unit 310, the image group in which the structure to be managed is imaged with the overlap area while moving the moving object 100. The image acquiring unit 401 acquires a single image group or a plurality of image groups for one structure.

The damage detecting unit 403 analyzes the images in the image group to detect the damage of the structure. The damage detection performed by the damage detecting unit 403 is performed by a known technique, and thus detailed description thereof is omitted. The damage detected by the damage detecting unit 403 includes general damage of the structure. For example, cracks, concrete exfoliation, or free lime.

The damage evaluating unit 405 evaluates a degree of damage detected by the damage detecting unit. The damage evaluating unit 405 performs evaluation of damage automatically or manually. In a case where the evaluation of the damage is performed automatically, the damage evaluating unit 405 evaluates the degree of the detected damage by image processing. In a case where the evaluation of the damage is performed manually, the damage evaluating unit 405 causes the user to recognize the damage displayed on the display unit 340 and evaluate the degree of damage via the operating unit 330. Note that it is preferable that the damage information including the damage evaluation be input in accordance with "Guideline for Bridge Regular Inspection (June 2014)" prepared by the Ministry of Land, Infrastructure, Transport and Tourism.

The three-dimensional design data acquiring unit 407 acquires three-dimensional design data indicating the structure to be managed, which is input by the device input and output unit 310. The three-dimensional design data is three-dimensional CAD data, for example.

The combined information calculating unit 409 tracks point group data of feature points common in the overlap area between the images in the image group to calculate combined information including a camera position and a camera posture in a case of capturing the image by the camera 202 and a three-dimensional position of the point group data. Specifically, the combined information calculating unit 409 calculates the camera position and the camera posture in a case of capturing the images in the image group by the camera and the three-dimensional position of the point group data by the SfM method or the SLAM method.

The mapping unit 411 maps the detected damage and the captured image on the surface of the structure indicated by the acquired three-dimensional design data based on the combined information calculated by the combined information calculating unit 409.

The calculation of the combined information performed by the combined information calculating unit 409 and the mapping by the mapping unit 411 will be described in detail below.

Figure 4:
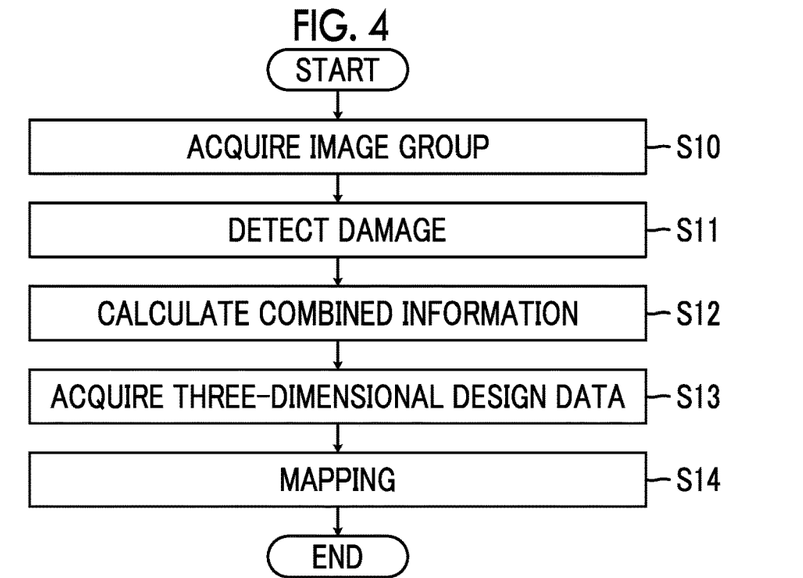
FIG. 4 is a flowchart of a structure management process (structure management method).

FIG. 4 is a flowchart of a structure management process (corresponding to the structure management method according to the embodiment of the present invention) performed by using the structure management device 300.

<<Acquisition of Image Group and Detection of Damage>>

First, the image acquiring unit 401 acquires an image group C including a captured image of a bridge B to be managed (step S10).

Figure 5:
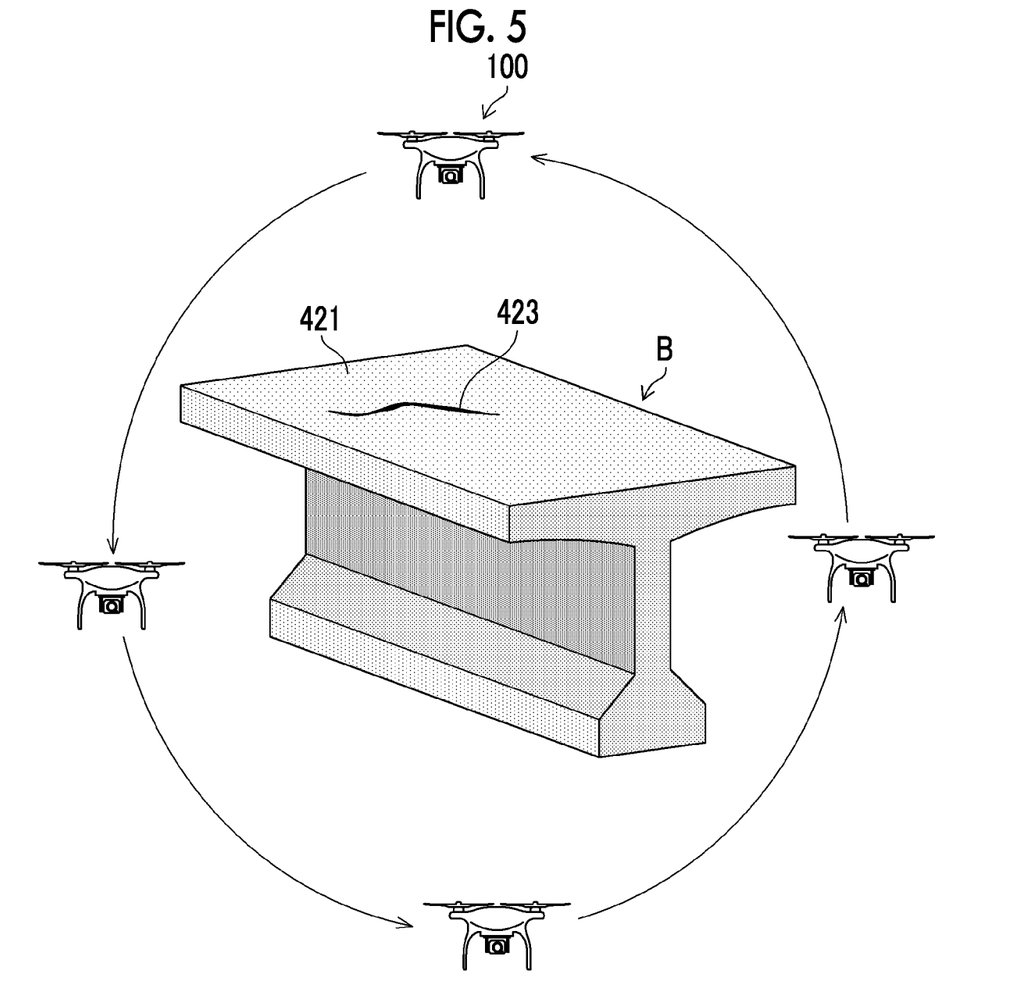
FIG. 5 is a perspective diagram conceptually showing a bridge to be managed.

FIG. 5 is a perspective diagram conceptually showing the bridge B to be managed and inspected. A crack 423, which is damage, exists on one plane 421 on the surface of the bridge B. The moving object 100 continuously images the bridge B while flying around the bridge B, and acquires the image group C. The image acquiring unit 401 acquires the image group C including the captured image of the bridge B which is acquired by the moving object 100.

Next, the damage detecting unit 403 detects the crack 423 from the captured image configuring the image group C (step S11 in FIG. 4).

Figure 6:
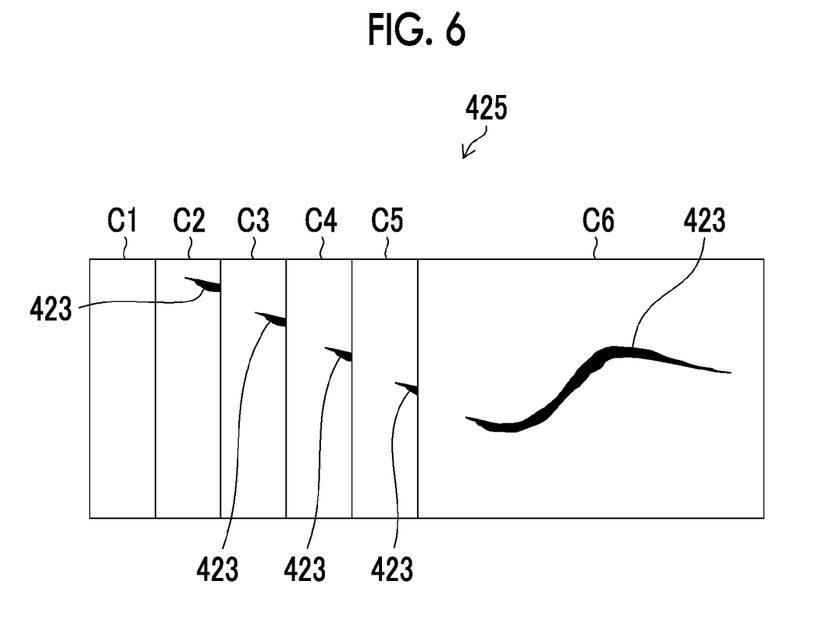
FIG. 6 is a diagram showing a part of an image group.

FIG. 6 is a diagram showing a part 425 of the image group C acquired by the image acquiring unit 401. The part 425 of the image group C is configured by captured images C1, C2, C3, C4, C5, and C6. The damage detecting unit 403 detects, for example, the crack 423 appearing in the captured image C6 by image analysis. The captured images C1, C2, C3, C4, C5, and C6 have overlap areas, and the crack 423 is also detected in the captured images C2, C3, C4, and C5. Therefore, in a case where the same damage is detected in a plurality of captured images, the damage detecting unit 403 may delete the overlap part.

<<Calculation of Combined Information>>

Next, the combined information calculating unit 409 calculates the position and the posture of the camera 202 and the three-dimensional position of the point group data of feature points common in the overlap area between the captured images configuring the image group C based on the image group C (step S12 in FIG. 4).

The combined information calculating unit 409 analyzes the image group C to estimate the position and the posture of the camera 202 in a case of capturing each captured image in the image group C as the combined information.

Specifically, the combined information calculating unit 409 extracts the feature point included in an area in which the captured images in the image group C overlap each other (overlap area), and specifies the correspondence relation of feature point between the captured images (corresponding points having the same local feature amounts).

As the local feature amounts that are robust against enlargement/reduction between the captured images (difference in imaging distances) or rotation, a scale-invariant feature transform (SIFT) feature amount, a speed-upped robust feature (SURF) feature amount, an accelerated kaze (AKAZE) feature amount are known. It is preferable that the number of corresponding points having the same feature amount (the number of sets) be several tens or more, and thus the overlap area between the captured images is large.

The position and the posture of the camera 202 are estimated based on a plurality of corresponding feature points between the captured images.

Figure 7:
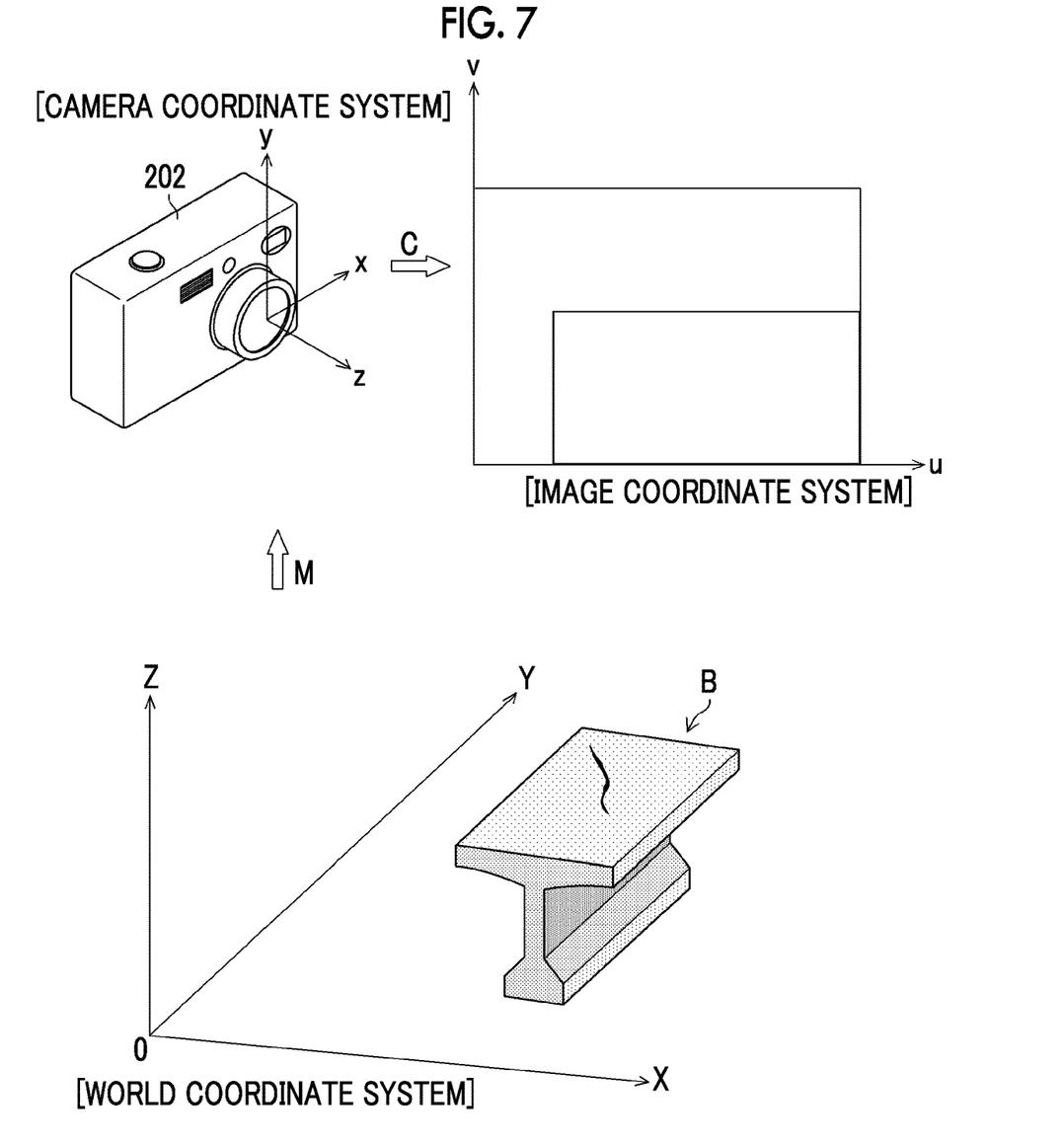
FIG. 7 is a diagram showing a relationship between a world coordinate system, a local coordinate system, and an image coordinate system.

FIG. 7 is a diagram showing a relationship between a world coordinate system, a local coordinate system, and an image coordinate system.

The three-dimensional position (three-dimensional shape) of a subject (bridge B in the embodiment) can be represented by the world coordinate system of XYZ orthogonal three axes having the origin O.

On the other hand, the local coordinate system of xyz orthogonal three axes (hereinafter, referred to as "camera coordinate system") is a coordinate system of the camera 202, which moves independently from the world coordinate system. The origin of the camera coordinate system is a focal position of the camera 202, and an optical axis direction is a z axis.

The image coordinate system is a coordinate system representing a two-dimensional position of the point on the captured image formed on the image sensor of the camera 202. A coordinates (u, v) of the feature point c on the captured image can be obtained by the number of pixels and the pixel pitch from a reference position of the image sensor of the camera 202.

A relationship between the coordinates (u, v) of the feature point c in the image coordinate system, the coordinates (X, Y, Z) of the feature point c in the world coordinate system, a matrix C representing the camera internal parameters, and a matrix M representing the camera external parameters can be represented by the following equation.

$$c\begin{pmatrix}u\\v\\1\end{pmatrix} = CM\begin{pmatrix}X\\Y\\Z\\1\end{pmatrix}$$

The camera internal parameters include the focal length, the image size of the image sensor, the pixel pitch, and the image center position, and can be acquired by calibration in advance.

The matrix M representing the camera external parameters is a coordinate transformation matrix from the world coordinate to the camera coordinate, and includes a translation vector representing the position of the camera 202 and a rotation matrix representing the posture of the camera 202.

The position and the posture of the camera 202 can be estimated by obtaining the matrix M representing the camera external parameters. The SfM method is known as a method for estimating the camera external parameters based on the feature points on a plurality of captured images.

In the SfM method, a plurality of feature points on the captured image captured while moving the camera 202 are tracked, and the position and the posture of the camera 202 and the three-dimensional position of the feature point are calculated by using the correspondence relation of the feature points. However, in the SfM method, the relative position between the camera 202 and the subject and the relative position and posture between the cameras can be estimated, but scale information cannot be obtained only from the captured image, and thus the absolute position cannot be estimated. Therefore, the absolute position can be estimated by adding the absolute position information such as the marker of which the three-dimensional position is known or the size information of the subject.

The combined information calculating unit 409 estimates, by adopting the SfM method with respect to the input image group C, the position and the posture of the camera 202 in a case of capturing each captured image in the image group C as the combined information.

The combined information calculating unit 409 is not limited to adopt the SfM method, but may adopt the SLAM method, for example. In the SLAM method, the position of the feature point and the position and the posture of the camera 202 can be estimated at the same time by using a set of feature points updated dynamically depending on a change in the input image. The basic principle of the SLAM method is disclosed in Andrew J. Davison, "Real-Time Simultaneous Localization and Mapping with a Single Camera", Proceedings of the 9th IEEE International Conference on Computer Vision Volume 2, 2003, pp. 1403-1410.

Figure 8:
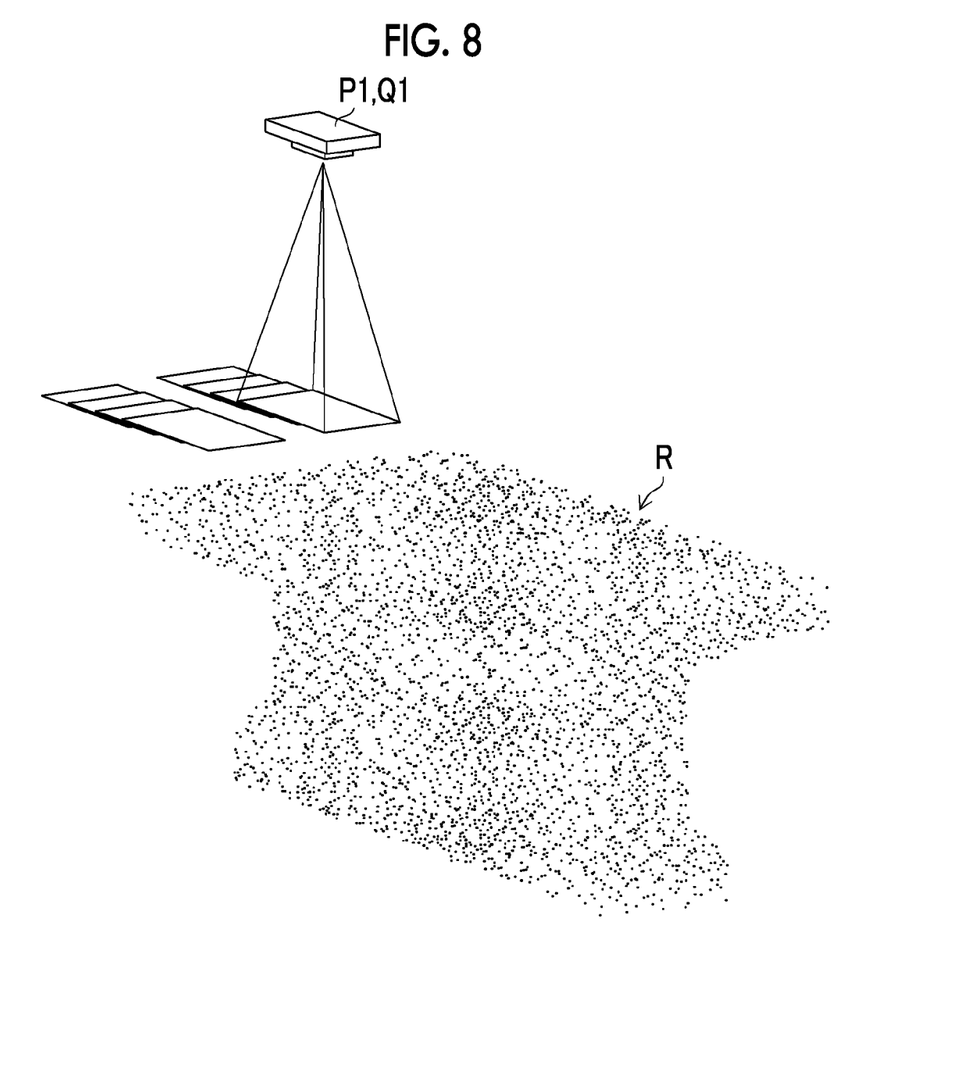
FIG. 8 is a diagram showing a position of a camera, a posture of a camera, and a three-dimensional position of point group data.

FIG. 8 is a diagram showing a position (position information) P1 of the camera 202, a posture (posture information) Q1 of the camera 202, and a three-dimensional position R of the point group data which are calculated by using the SfM method as described above, and the combined information calculated by the combined information calculating unit 409 includes information items.

<<Mapping>>

Figure 9:
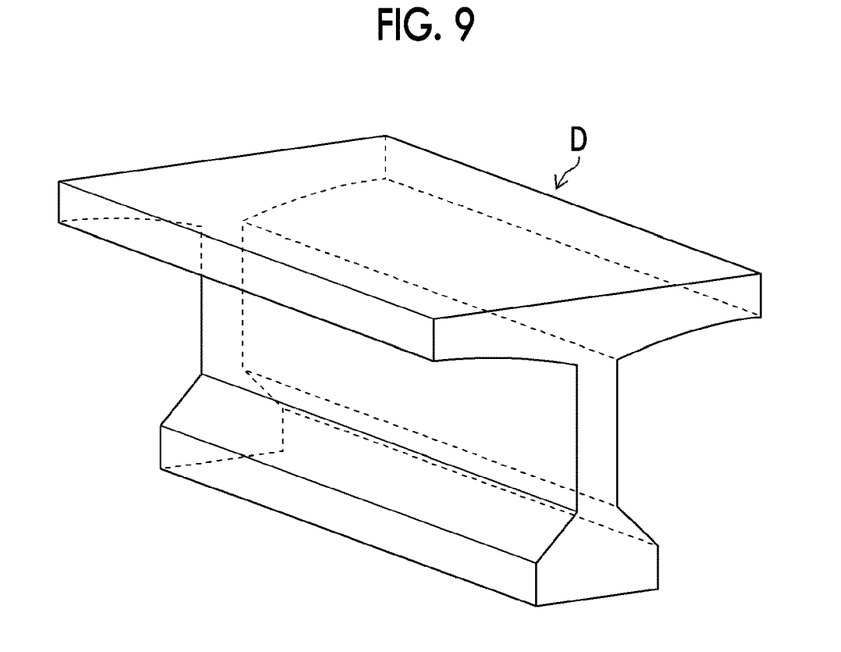
FIG. 9 is a diagram showing three-dimensional design data.

Next, the three-dimensional design data acquiring unit 407 acquires three-dimensional design data D of the bridge B (FIG. 4 in step S13). FIG. 9 is a diagram showing the three-dimensional design data D of the bridge B.

Thereafter, the mapping unit 411 maps the crack 423 detected in the captured image C6 on the three-dimensional design data D (FIG. 4 in step S14). Here, the inspection result is obtained by mapping the captured image to the three-dimensional design data D.

Figure 10:
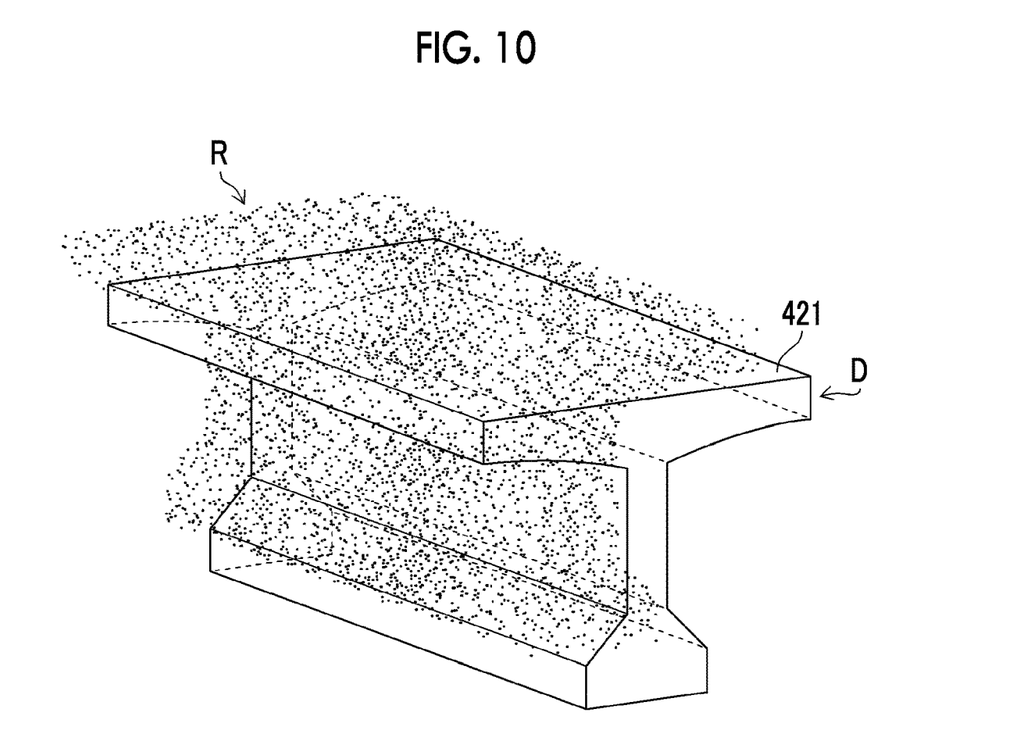
FIG. 10 is a conceptual diagram showing registration of the three-dimensional position of the point group data and the three-dimensional design data.

FIG. 10 is a conceptual diagram showing registration of the three-dimensional position R of the point group data and the three-dimensional design data D. Here, the registration means that the three-dimensional position R of the point group data and the three-dimensional design data D have the same shape.

The three-dimensional design data D and the three-dimensional position R of the point group data are placed on the same coordinate system. By using the plane 421 of the three-dimensional design data D as a reference, the three-dimensional position R of the point group data is subjected to translational correction, rotational correction, and/or expansion and contraction correction such that the plane 421 of the three-dimensional design data D coincides with a corresponding plane of the three-dimensional position R of the point group data. For example, it is calculated by the least squares method so as to minimize the difference between the plane 421 of the three-dimensional design data D and the plane 421 of the three-dimensional position R of the point group data, and the correction is performed on the three-dimensional position R of the point group data. By performing the registration of the three-dimensional position R of the point group data using the three-dimensional design data D as a reference, the three-dimensional design data does not become a different three-dimensional model for each inspection management, and thus comparison with the past inspection result can be easily performed. In a case where the absolute position of the three-dimensional position R of the point group data is estimated by the marker as described above, the three-dimensional position R of the point group data may be a reference.

Figure 11:
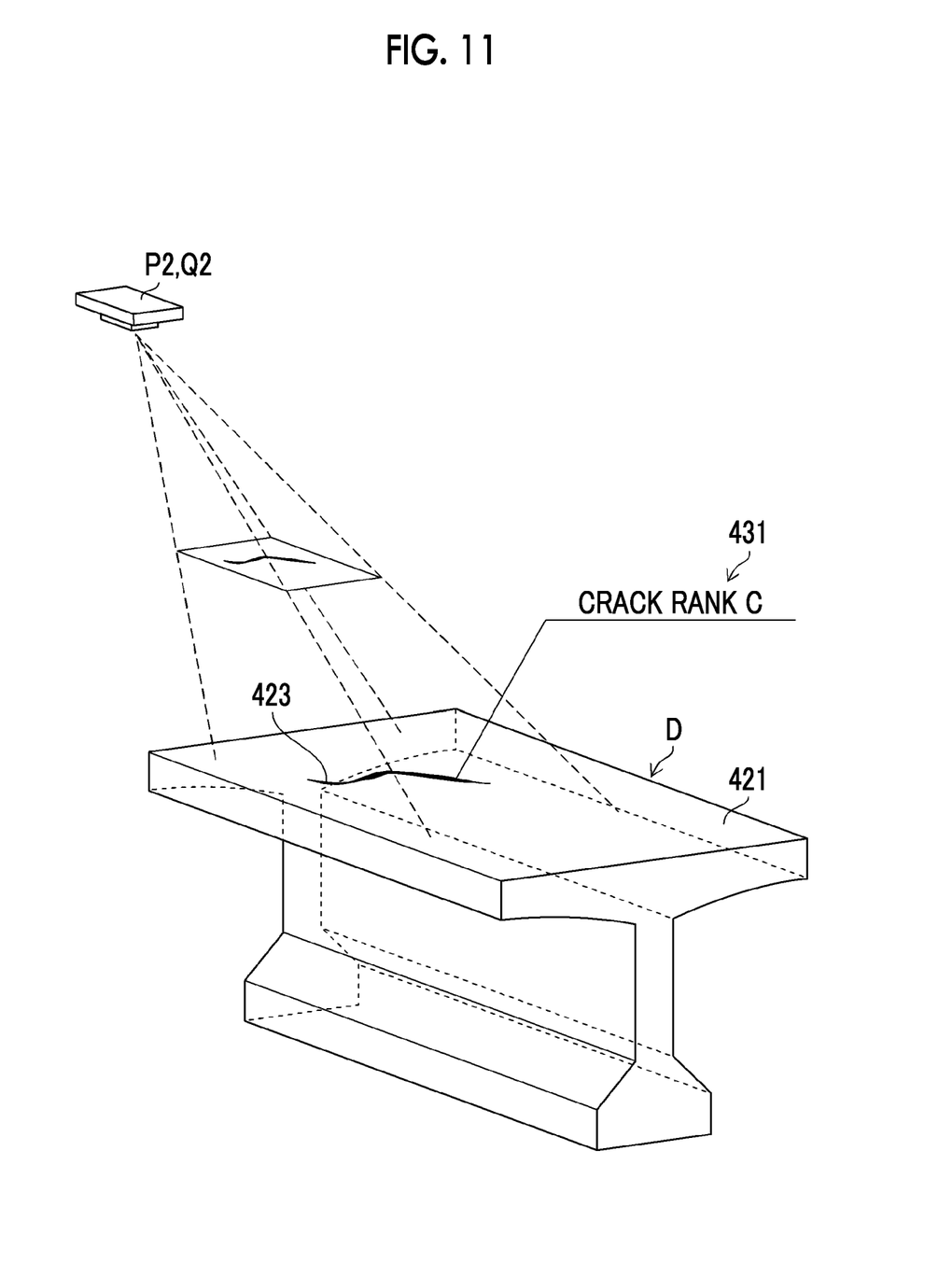
FIG. 11 is a diagram showing that a crack is mapped on a plane of the three-dimensional design data.

FIG. 11 is a diagram showing that the crack 423 is mapped on the plane 421 of the three-dimensional design data D by the mapping unit 411. In a case where the registration of the three-dimensional position R of the point group data is performed by using the three-dimensional design data D as a reference, the mapping unit 411 calculates a correction coefficient W of the three-dimensional position R of the point group data. The mapping unit 411 calculates a position P2 and a posture Q2 of the camera 202 after the registration described above from the correction coefficient W, and the position P1 and the posture Q1 of the camera 202 estimated by using the SfM method. Based on the position P2 and the posture Q2 of the camera 202, the mapping unit 411 calculates a new determinant, and maps the crack 423 on the plane 421 of the three-dimensional design data D. A known technique is used for mapping of the crack 423 imaged at the position P2 and the posture Q2 of the camera 202, and thus the description thereof is omitted. As described above, by mapping the damage 423 on the plane 421 of the three-dimensional design data D, the mapped captured image has uniformity, and the deterioration of image quality of the mapped image is suppressed. By mapping the damage 423 on the plane 421 of the three-dimensional design data D, comparison with the past inspection result (the past damage mapped on the plane 421 of the three-dimensional design data D) can be performed.

As the crack 423 is mapped on the three-dimensional design data D, the display unit 340 displays "crack" that is a type of the damage and "rank C" that is a degree of damage, which are the damage information 431 of the crack 423.

Figure 12:
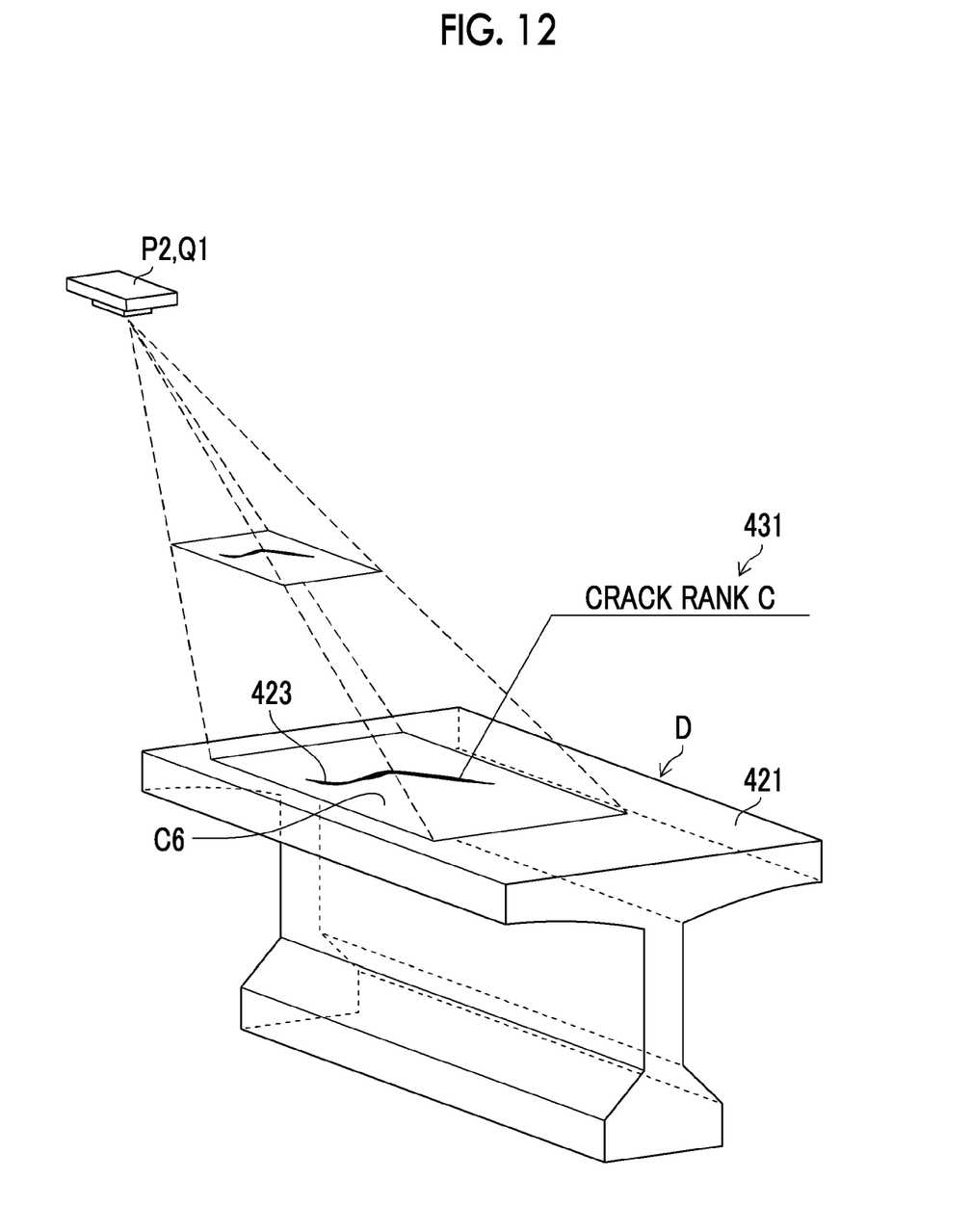
FIG. 12 is a diagram showing that a captured image and a crack are mapped on a plane of the three-dimensional design data.

FIG. 12 is a diagram showing a modification example of a mapping form, and is a diagram showing that the captured image C6 is mapped on the plane 421 of the three-dimensional design data D. In addition to the crack 423, the captured image configuring the image group C can be mapped on the plane 421 of the three-dimensional design data D. In this case, each captured image is mapped, and the detected crack 423 is mapped on the mapped captured image. FIG. 12 shows only the mapping of the captured image C6, but the image group C is mapped on the plane 421 of the three-dimensional design data D. In a case where the image group C is mapped, continuous strip-shaped captured images are mapped as shown in FIG. 6.

As described above, in the present invention, the detected damage is mapped on the surface of the structure indicated by the acquired three-dimensional design data based on the combined information calculated by the combined information calculating unit. Accordingly, deterioration of image quality of a mapped damage is suppressed and comparison with the past inspection result can be easily performed.

In the embodiment, the hardware structure of the processing unit that executes various processing is the following various processors. The various processors include the CPU that is a general-purpose processor executing the software (program) and functioning as the various processing units, a programmable logic device (PLD) that is a processor whose circuit configuration can be changed after manufacture, such as a field programmable gate array (FPGA), and a dedicated electric circuit that is a processor having a circuit configuration that is designed for exclusive use in order to execute specific processing, such as an application specific integrated circuit (ASIC).

One processing unit may be configured by one of these various processors, or two or more processors of the same type or different types (for example, a plurality of FPGAs, or a combination of the CPU and the FPGA). Also, a plurality of processing units may be configured by one processor. As an example of configuring a plurality of processing units with one processor, first, as represented by a computer such as a client or a server, there is a form in which one processor is configured by a combination of one or more CPUs and software, and the processor functions as a plurality of processing units. Second, as represented by a system on chip (SoC), there is a form in which a processor is used that realizes the functions of the entire system including a plurality of processing units with a single integrated circuit (IC) chip. As described above, the various processing units are configured by one or more of the above various processors as a hardware structure.

Furthermore, the hardware structure of these various processors is, more specifically, an electric circuit (circuitry) in which circuit elements such as semiconductor elements are combined.

Each configuration and function described above can be appropriately implemented by any hardware, software, or a combination thereof. For example, the present invention can be adopted to a program that causes a computer to execute the processing steps (processing procedure), a computer readable recording medium recording the program (non-transitory recording medium), or a computer on which the program can be installed.

Although the example of the present invention has been described above, it is needless to say that the present invention is not limited to the above-described embodiment and various modifications can be made without departing from the spirit of the present invention.

EXPLANATION OF REFERENCES

1: structure management system
100: moving object
108: moving object driving unit
130: moving object control unit
202: camera
204: imaging control unit
230: moving object input and output unit
300: structure management device
310: device input and output unit
320: device control unit
330: operating unit
340: display unit
350: recording unit
401: image acquiring unit
403: damage detecting unit
405: damage evaluating unit
407: three-dimensional design data acquiring unit
409: combined information calculating unit
411: mapping unit

What is claimed is:

1. A structure management device comprising:
at least one processor configured to:
acquire an image group in which a structure is imaged with overlap areas by a camera by moving a moving object equipped with the camera;
analyze images in the image group to detect damage of the structure;
acquire three-dimensional design data indicating the structure;
track point group data of feature points common in the overlap area between the images in the image group to calculate combined information including a camera position and a camera posture in a case of capturing the image by the camera and a three-dimensional position of the point group data; and
map the detected damage on a surface of the structure indicated by the acquired three-dimensional design data based on the combined information based on a correction coefficient and by using the combined information, wherein the correction coefficient is calculated such that the surface of the structure indicated by the acquired three-dimensional design data coincides with a surface corresponding to the three-dimensional position of point group data.

2. The structure management device according to claim 1, wherein
the at least one processor maps the images in the image group on the surface of the structure indicated by the acquired three-dimensional design data based on the combined information, and maps the detected damage on the mapped image.

3. The structure management device according to claim 1, wherein
the at least one processor evaluates a degree of the detected damage,
causes a display to display the acquired three-dimensional design data and the mapped damage, and
further causes the display to display damage information including a result of damage evaluation, in association with a position of the mapped damage.

4. The structure management device according to claim 1, further comprising a non-transitory computer readable recording medium configured to record the three-dimensional design data thereon, wherein
the at least one processor evaluates a degree of the detected damage, and the recording medium records thereon, damage information including a result of damage evaluation, in association with position information of the mapped damage.

5. The structure management device according to claim 3, wherein the damage information includes a type of the detected damage, a rank indicating the degree of the detected damage, and a size of the detected damage.

6. The structure management device according to claim 1, wherein the at least one processor calculates the camera position and the camera posture in a case of capturing the images in the image group by the camera and the three-dimensional position of the point group data using a structure from motion method or a simultaneous localization and mapping method.

7. The structure management device according to claim 1, further comprising:
   a moving object equipped with a camera; and
   a camera-side processor configured to control movement of the moving object and imaging of the camera and causes the camera to capture the image group,
   wherein the at least one processor acquires the image group captured by the camera equipped in the moving object.

8. The structure management device according to claim 7, wherein the moving object is a flying object.

9. A structure management method comprising:
   a step of acquiring, by at least one processor, an image group in which a structure is imaged with overlap areas by a camera by moving a moving object equipped with the camera;
   a step of analyzing, by the at least one processor, images in the image group to detect damage of the structure;
   a step of acquiring, by the at least one processor, three-dimensional design data indicating the structure;
   a step of tracking, by the at least one processor, point group data of feature points common in the overlap area between the images in the image group to calculate combined information including a camera position and a camera posture in a case of capturing the image by the camera and a three-dimensional position of the point group data; and
   a step of mapping, by the at least one processor, the detected damage on a surface of the structure indicated by the acquired three-dimensional design data, based on the calculated combined information based on a correction coefficient and by using the combined information, wherein the correction coefficient is calculated such that the surface of the structure indicated by the acquired three-dimensional design data coincides with a surface corresponding to the three-dimensional position of point group data.

10. The structure management method according to claim 9, wherein in the step of mapping, the images in the image group are mapped on the surface of the structure indicated by the acquired three-dimensional design data based on the combined information, and the detected damage is mapped on the mapped image.

11. The structure management method according to claim 9, further comprising:
    a step of evaluating, by the at least one processor, a degree of the detected damage; and
    a step of displaying on a display, the acquired three-dimensional design data and the mapped damage,
    wherein in the step of displaying, damage information including a result of damage evaluation is further displayed in association with a position of the mapped damage.

12. A non-transitory computer readable recording medium that, in a case where a command stored in the recording medium is read by a computer, causes the computer to realize a structure management function comprising:
    a function of acquiring an image group in which a structure is imaged with overlap areas by a camera by moving a moving object equipped with the camera;
    a function of analyzing images in the image group to detect damage of the structure;
    a function of acquiring three-dimensional design data indicating the structure;
    a function of tracking point group data of feature points common in the overlap area between the images in the image group to calculate combined information including a camera position and a camera posture in a case of capturing the image by the camera and a three-dimensional position of the point group data; and
    a function of mapping the detected damage on a surface of the structure indicated by the acquired three-dimensional design data based on the calculated combined information based on a correction coefficient and by using the combined information, wherein the correction coefficient is calculated such that the surface of the structure indicated by the acquired three-dimensional design data coincides with a surface corresponding to the three-dimensional position of point group data.

13. The structure management device according to claim 1, wherein
    the at least one processor calculates the correction coefficient, and correction of the correction coefficient includes at least one of translational correction, rotational correction, and expansion and contraction correction.

* * * * *